(12) United States Patent
Barnes et al.

(10) Patent No.: US 12,086,140 B2
(45) Date of Patent: Sep. 10, 2024

(54) DATA EXTRACTION AND MANAGEMENT

(71) Applicant: Twilio Inc., San Francisco, CA (US)

(72) Inventors: Dominic Barnes, San Francisco, CA (US); Tyson Winfield Mote, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 27 days.

(21) Appl. No.: 17/971,439

(22) Filed: Oct. 21, 2022

(65) Prior Publication Data

US 2024/0134859 A1   Apr. 25, 2024
US 2024/0232198 A9   Jul. 11, 2024

(51) Int. Cl.
*G06F 16/2455*   (2019.01)
*G06F 16/2457*   (2019.01)

(52) U.S. Cl.
CPC .... *G06F 16/2455* (2019.01); *G06F 16/24575* (2019.01)

(58) Field of Classification Search
CPC ........ G06F 16/2455; G06F 16/24575
See application file for complete search history.

(56) References Cited

U.S. PATENT DOCUMENTS

| 10,783,120 | B1 * | 9/2020 | Brown ................... G06F 3/065 |
| 11,055,352 | B1 * | 7/2021 | Beitchman ........ G06F 16/90335 |
| 2016/0241676 | A1 * | 8/2016 | Armstrong ........ G06F 16/24568 |
| 2021/0097067 | A1 * | 4/2021 | Virtuoso ............. G06F 16/2455 |
| 2021/0311958 | A1 * | 10/2021 | Searle ................... G06F 16/254 |

* cited by examiner

*Primary Examiner* — Grace Park
(74) *Attorney, Agent, or Firm* — Schwegman Lundberg & Woessner, P.A.

(57) ABSTRACT

Various embodiments include systems, methods, and non-transitory computer-readable media for managing data. Consistent with these embodiments, a method includes retrieving a control-plane configuration that includes a source identifier and a query; establishing a connection with a source based on a source identifier, the source including a database; executing the query against the database; receiving a data record returned as a result of execution of the query, the data record being associated with metadata; determining that the metadata has changed since a previously-returned data record that is returned in response to a previously-executed query; and causing the data record to be transmitted to a destination in response to receiving the query.

18 Claims, 9 Drawing Sheets

| SQL Type | JSON Type |
|---|---|
| BOOLEAN | Boolean |
| All numeric types: NUMBER, DECIMAL, INT, FLOAT, DOUBLE, etc. | Number |
| All string and binary types: VARCHAR, CHAR, STRING, TEXT | String |
| All binary types: BINARY, VARBINARY | String (hex-encoded) |
| DATE, DATETIME, TIMESTAMP | String (ISO 8601) |
| TIME | String |
| VARIANT, OBJECT, ARRAY, JSON, JSONB | JSON Object or Array |

FIG. 6

DATA EXTRACTION AND MANAGEMENT

TECHNICAL FIELD

The present disclosure generally relates to data management, and, more particularly, various embodiments described herein provide for systems, methods, techniques, instruction sequences, and devices that facilitate efficient data extraction from various sources in preparation for delivery to various destinations.

BACKGROUND

High throughput systems face challenges when it comes to accessing and extracting data efficiently from various data sources. Inefficient data accessing and extraction can cause various issues, including system latency on data processing and unnecessary consumption of computing resources that can be allocated for handling core job execution logic.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 6 is a block diagram illustrating an example mapping between data types, managed by an example data management system during operation, according to various embodiments of the present disclosure.

DETAILED DESCRIPTION

Figure 1:
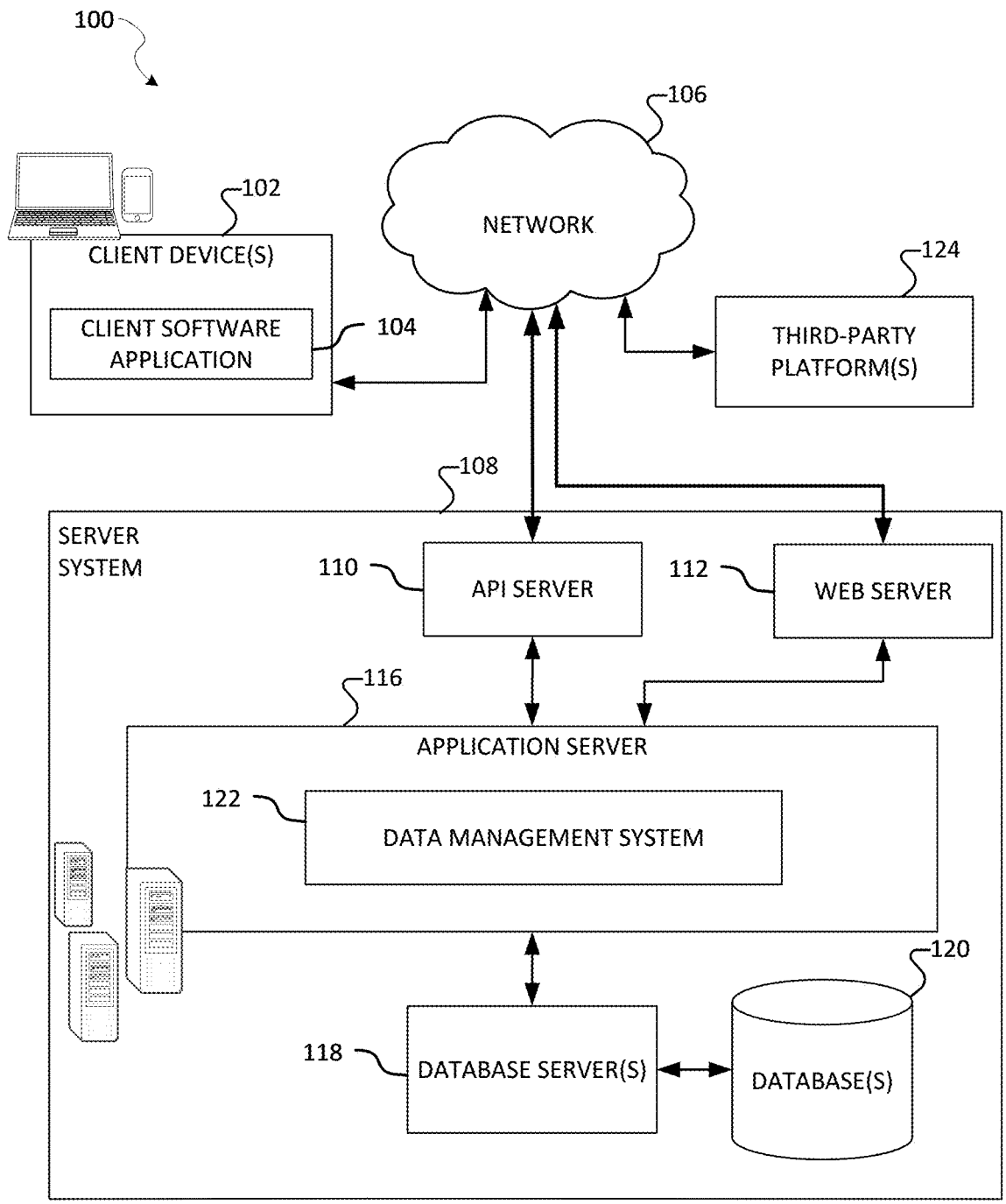
FIG. 1 is a block diagram showing an example networked environment that includes a data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Various examples include systems, methods, and non-transitory computer-readable media for data management that facilitate efficient data extraction from various sources (e.g., customers' data warehouses) in preparation for delivery to various destinations. Specifically, a data management system retrieves a control-plane configuration that at least includes one or more source identifiers and one or more queries (e.g., Structured Query Language (SQL) query) from a control plane. In various embodiments, a customer may provide the control-plane configuration via the control plane. Each source (e.g., database) may include one or more models specified by the customer. When a customer defines the one or more models, including the SQL queries that the data management system will execute, the control-plane configuration can be added to the control-plane database in discrete data tables. This approach ensures a high degree of control and allows multiple models to be separately defined for a given source.

In various embodiments, upon retrieving the control-plane configuration, the data management system decrypts one or more passwords in connection settings before establishing one or more connections with one or more sources based on the one or more source identifiers.

In various embodiments, the data management system executes the one or more queries and receives one or more data records returned as a result of the execution of the one or more queries. The one or more data records may include the associated metadata, such as checksum data. In various embodiments, checksum data may include a hash value generated based on one or more columns of a data record stored in a database. The checksum data may be generated using a message-digest algorithm and stored in a data table in the database that stores the corresponding data record.

In various embodiments, the data management system determines whether the metadata associated with one or more data records has changed since a previously-returned data record returned in response to a previously-executed query. Upon determining that the metadata has changed, the data management system may cause one or more data records (e.g., the currently-returned data record) to be transmitted to a destination specified by the customer.

In various embodiments, the data management system determines that metadata associated with one or more data records has changed since a previously-returned data record. The data management system may determine a difference between the previously-returned data record and a currently-returned data record and cause the difference to be transmitted to the destination.

In various embodiments, upon determining the difference between the previously-returned data record and the currently-returned data record, the data management system may send along one or more full rows associated with the difference, even if, for example, only one value has changed within the rows. This approach improves the efficiency of the system as the full row is needed for downstream data processing.

In various embodiments, upon determining that the metadata remains the same since the previously-returned data record returned in response to the previously-executed query, the data management system may cause a data representation (e.g., a pointer) of the previously-returned data record to be transmitted to the destination. In various embodiments, upon determining that the metadata remains the same since the previously-returned data record returned in response to the previously-executed query, the data management system may not return the data representation of the previously-returned data record if no further processing is needed for that data record (e.g., one or more rows). Under these approaches, the volumes of data that are needed for transportation are significantly reduced, thereby reducing system latency and conserving computing resources.

In various embodiments, the data management system determines one or more timestamps associated with a data record returned as a result of the execution of the query. The data management system identifies a portion of the data record associated with a timestamp (e.g., most recent timestamp) specified in the query and causes the portion of the data record to be transmitted to the destination in response to receiving the query.

In various embodiments, the data management system converts the data record returned as the result of the execution of the query to compressed JavaScript Object Notation (JSON) data based on a mapping, such as an example mapping as illustrated in FIG. 6. The data management system generates one or more messages based on the converted compressed JSON data.

In various embodiments, the data management system determines a status of the data record based on the metadata associated with the data record. The status of the message may be new, updated, or deleted, indicating if the data record is new, updated, or deleted. The data management system may associate the status of the data record with a message generated based on the data record.

In various embodiments, the data management system writes one or more messages to one or more databases based on one or more retention policies. For example, a data retention policy may specify that data, including messages as described herein, for a particular customer shall be stored for 45 days or no more than 30 days. Such data clearance or deletion operations can be implemented by configuring such retention policies for individual messages or periodically purging all data from the underlying data stores.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example networked environment 100 that includes a data management system 122, according to various embodiments of the present disclosure. By including the data management system 122, the networked environment 100 can facilitate efficient data access and management in high throughput and multifaceted networked environment as described herein. As shown, the networked environment 100 includes one or more client devices 102, a server system 108, and a network 106 (e.g., including Internet, wide-area-network (WAN), local-area-network (LAN), wireless network, etc.) that are communicatively coupled together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the networked environment 100 are described herein as being performed by the data management system 122 on the server system 108, it will be appreciated that the location of certain functionality within the server system 108 is a design choice. For example, it may be technically preferable to initially deploy certain technology and functionality within the server system 108, but later migrate this technology and functionality to the client software application 104.

With respect to server system 108, each Application Program Interface (API) server 110 and web server 112 is coupled to an application server 116, which hosts the data management system 122. The application server 116 is communicatively coupled to a database server 118, which facilitates access to a database 120 that stores data associated with the application server 116, including data that may be generated or used by the data management system 122, in various embodiments.

The API server 110 receives and transmits data (e.g., API calls, commands, requests, responses, and authentication data) between the client device 102 and the application server 116, and between the one or more services and the application server 116. Specifically, the API server 110 provides a set of interfaces (e.g., endpoint, routines, or protocols) that can be called or queried by the client software application 104 or the one or more services in order to invoke the functionalities of the application server 116. The API server 110 exposes various functions supported by the application server 116, including without limitation: user registration; login functionality; data object operations (e.g., extraction, generating, storing, retrieving, encrypting, decrypting, transferring, access rights, licensing, etc.), and user communications.

Through one or more web-based interfaces (e.g., web-based user interfaces), the web server 112 can support various functions of the data management system 122 of the application server 116. In various embodiments, the deployment or implementation of the web server 112 and the application server 116 may share the same set of executable code. In various embodiments, the web server 112 may be a subsystem or a component of the application server 116.

The application server 116 hosts a number of applications and subsystems, including the data management system 122, which supports various functions and services with respect to various embodiments described herein. The application server 116 is communicatively coupled to a database server 118, which facilitates access to database(s) 120 that stores data associated with the data management system 122.

Figure 2:
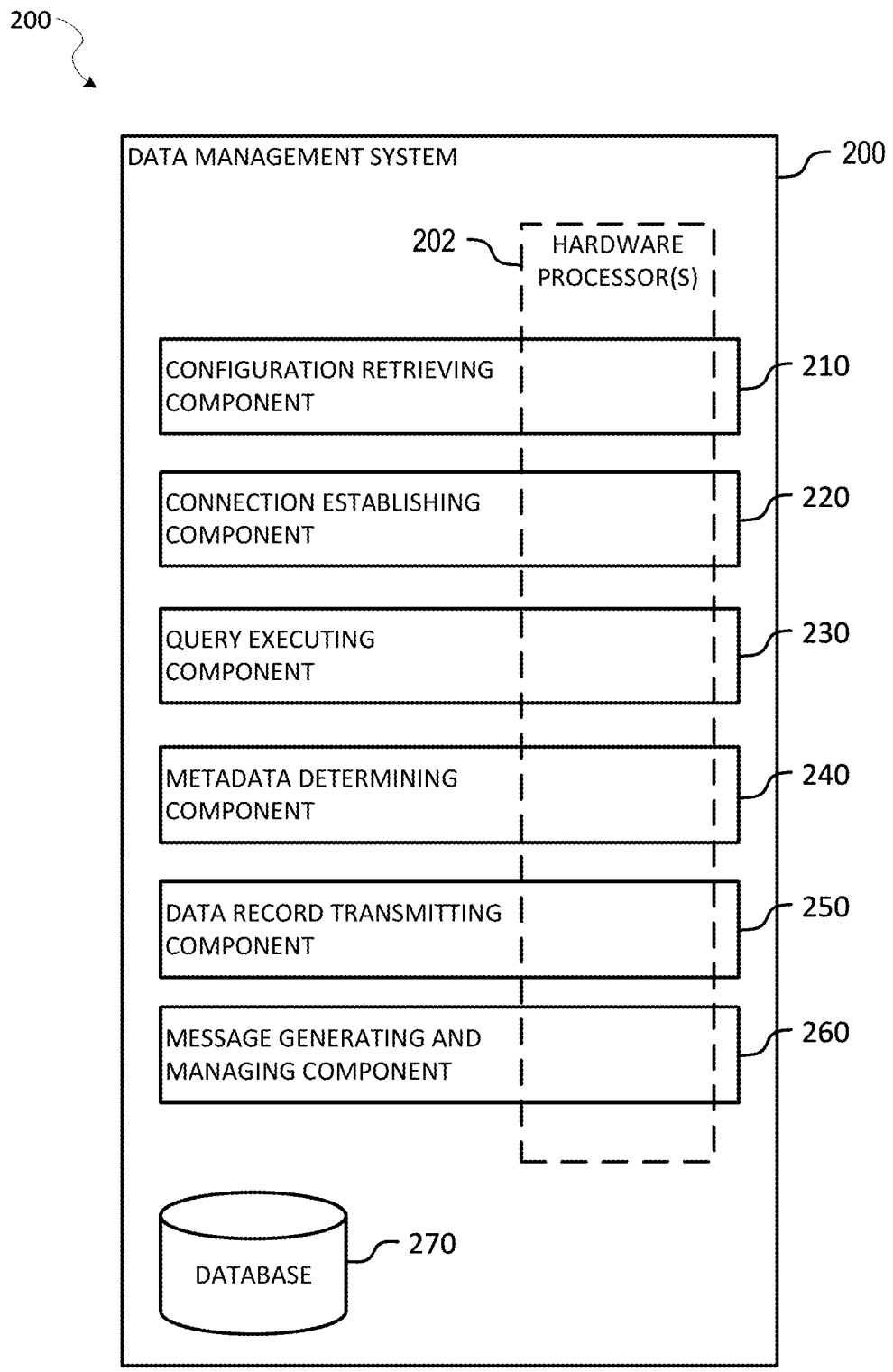
FIG. 2 is a block diagram illustrating an example data management system, according to various embodiments of the present disclosure.

FIG. 2 is a block diagram illustrating an example data management system 200, according to various embodiments of the present disclosure. For some embodiments, the data management system 200 represents an example of the data management system 122 described with respect to FIG. 1. As shown, the data management system 200 comprises a configuration retrieving component 210, a connection establishing component 220, a query executing component 230, a metadata determining component 240, a data record transmitting component 250, and a messaging generating and managing component 260. According to various embodiments, one or more of the configuration retrieving component 210, the connection establishing component 220, the query executing component 230, the metadata determining component 240, the data record transmitting component 250, and the messaging generating and managing component 260 are implemented by one or more hardware processors 202. Data generated by one or more of the configuration retrieving component 210, the connection establishing component 220, the query executing component 230, the metadata determining component 240, the data record transmitting component 250, and the messaging generating and managing component 260 is stored in a database 270 of the data management system 200.

In various embodiments, the configuration retrieving component 210 is configured to retrieve control-plane configurations. A control-plane configuration may at least include one or more source identifiers and one or more SQL queries from a control plane. In various embodiments, a customer (or a user) may provide the control-plane configuration via the control plane. Each source (e.g., database) may include one or more models specified by the customer. When a customer defines the one or more models, including the SQL queries that the data management system will execute, the control-plane configuration can be added to the control-plane database in discrete data tables. This approach ensures a high degree of control and allows multiple models to be separately defined for a given source.

In various embodiments, the connection establishing component 220 is configured to establish one or more connections with one or more sources based on the one or more source identifiers. In various embodiments, the connection establishing component 220 is configured to decrypt one or more passwords in connection settings before establishing the one or more connections.

In various embodiments, the query executing component 230 is configured to execute the one or more queries and receives one or more data records returned as a result of the execution of the one or more queries. The one or more data records may include the associated metadata, such as checksum data. In various embodiments, checksum data may include a hash value generated based on one or more columns of a data record stored in a database.

In various embodiments, the metadata determining component 240 is configured to determine whether the metadata associated with one or more data records has changed since a previously-returned data record returned in response to a previously-executed query.

In various embodiments, the data record transmitting component 250 is configured to cause one or more data records (e.g., the currently-returned data record) to be transmitted to a destination specified by the customer (or user).

In various embodiments, the messaging generating and managing component 260 is configured to generate one or more messages based on the data record turned as the result of the execution of the query. Specifically, the messaging generating and managing component 260 is configured to convert the data record to compressed JavaScript Object Notation (JSON) data based on a mapping (e.g., the mapping as illustrated in FIG. 6) before generating the one or more messages. The messaging generating and managing component 260 is further configured to write the one or more messages to one or more databases based on one or more retention policies. Specifically, a data retention policy may specify that data, including messages as described herein, for a particular customer shall be stored for 45 days or no more than 30 days. Such data clearance or deletion operations can be implemented by configuring such retention policies for individual messages or periodically purging all data from the underlying data stores.

Figure 3:
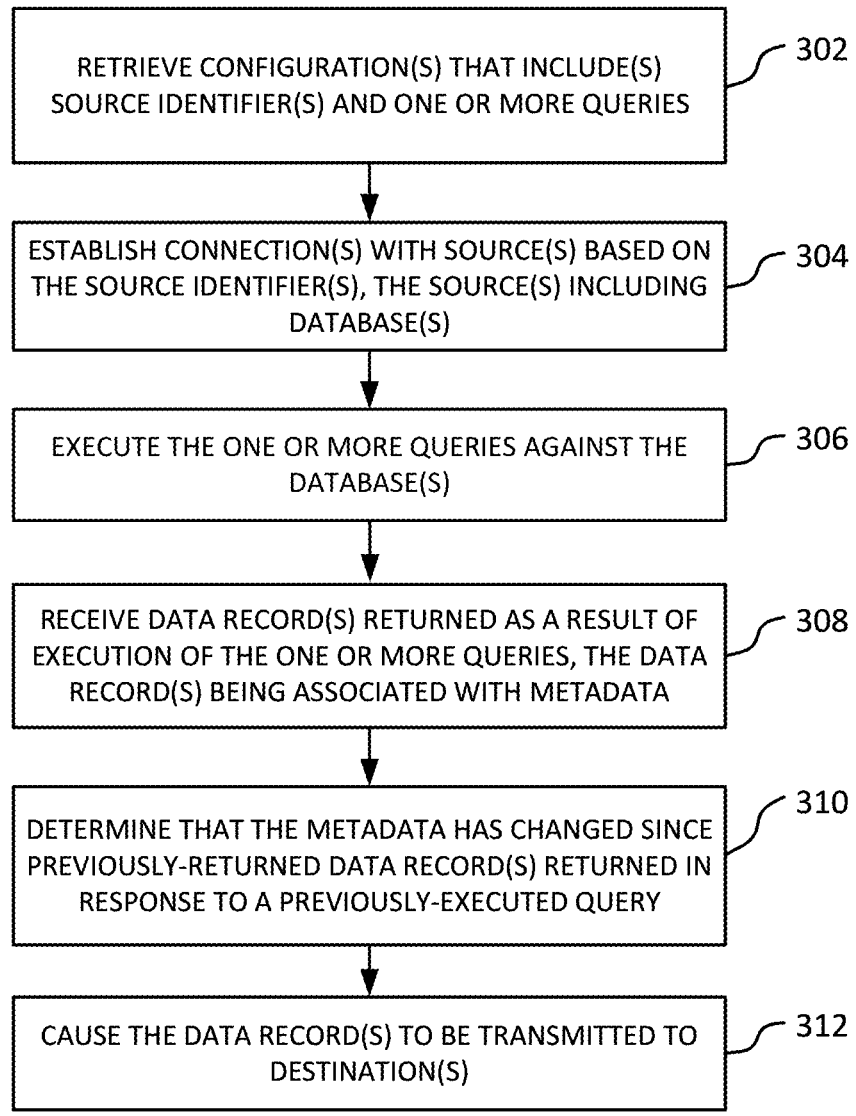
FIG. 3 is a flowchart illustrating an example method for managing data extraction, according to various embodiments of the present disclosure.

FIG. 3 is a flowchart illustrating an example method 300 for managing data extraction, according to various embodiments of the present disclosure. It will be understood that example methods described herein may be performed by a machine in accordance with some embodiments. For example, the method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor retrieves control-plane configurations. A control-plane configuration may at least include one or more source identifiers and one or more SQL queries from a control plane. In various embodiments, a customer (or a user) may provide the control-plane configuration via the control plane. Each source (e.g., database) may include one or more models specified by the customer.

At operation 304, a processor establishes one or more connections with one or more sources (e.g., databases) based on the one or more source identifiers (e.g., database identifiers).

At operation 306, a processor executes the one or more queries against the one or more sources (e.g., databases).

At operation 308, a processor receives one or more data records returned as a result of the execution of the one or more queries. The one or more data records may include the associated metadata, such as checksum data. In various embodiments, checksum data may include a hash value generated based on one or more columns of a data record stored in a database.

At operation 310, a processor determines whether the metadata associated with one or more data records has changed since a previously-returned data record returned in response to a previously-executed query. Upon determining that the metadata has changed, the processor may cause, at operation 312, one or more data records (e.g., the currently-returned data record) to be transmitted to a destination specified by the customer. In various embodiments, the processor determines that metadata associated with one or more data records has changed since a previously-returned data record. The processor may then determine a difference between the previously-returned data record and a currently-returned data record and cause, at operation 312, the difference to be transmitted to the destination.

In various embodiments, upon determining that the metadata remains the same since the previously-returned data record returned in response to the previously-executed query, the processor may cause, at operation 312, a data representation (e.g., a pointer) of the previously-returned data record to be transmitted to the destination. In various embodiments, upon determining that the metadata remains the same since the previously-returned data record returned in response to the previously-executed query, the processor may not return the data representation of the previously-returned data record if the processor determines that no further processing is needed for that data record (e.g., one or more rows). Under these approaches, the volumes of data that are needed for transportation are significantly reduced, thereby reducing system latency and conserving computing resources.

At operation 312, depending on the determination of checksum data and timestamp as described in, a processor may cause the data record, the data representation (e.g., a pointer) of the previously-returned data record, or the portion of the data record associated with a timestamp (e.g., most recent timestamp) to be transmitted to the destination in response to receiving the query.

Though not illustrated, the method 300 can include an operation where a graphical user interface for managing data can be displayed (or caused to be displayed) by the hardware processor. For instance, the operation can cause a computing device to display the graphical user interface for managing data. This operation for displaying the graphical user interface can be separate from operations 302 through 312 or, alternatively, form part of one or more of operations 302 through 312.

Figure 4:
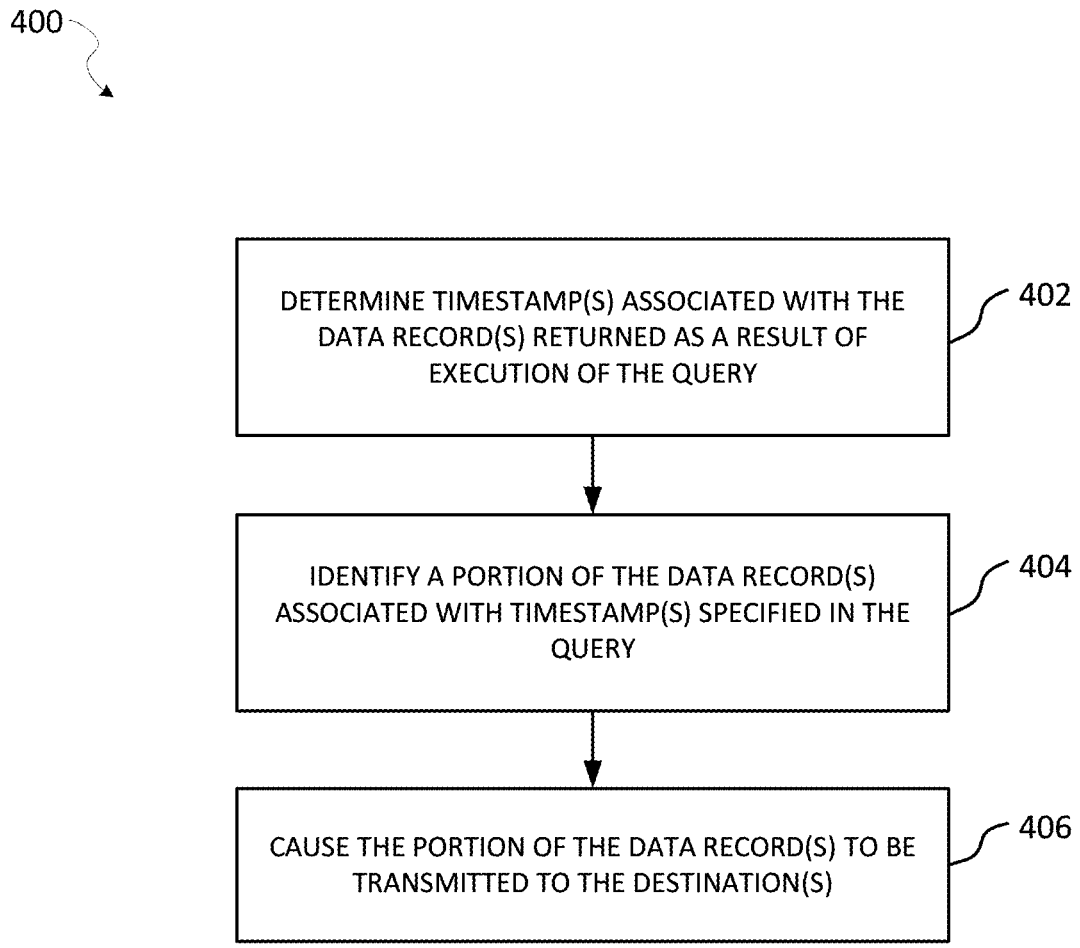
FIG. 4 is a flowchart illustrating an example method for managing data extraction, according to various embodiments of the present disclosure.

FIG. 4 is a flowchart illustrating an example method 400 for managing data extraction, according to various embodiments of the present disclosure. It will be understood that example methods described herein may be performed by a machine in accordance with some embodiments. For example, the method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 400 may be a sub-routine of one or more of the operations of method 300. In various embodiments, one or more operations in method 400 may be performed subsequent to the operations of method 300.

At operation 402, a processor determines one or more timestamps associated with a data record returned as a result of the execution of the query.

At operation 404, a processor identifies a portion of the data record associated with a timestamp (e.g., most recent timestamp) specified in the query.

At operation 406, a processor causes the portion of the data record to be transmitted to the destination.

Though not illustrated, the method 400 can include an operation where a graphical user interface for managing data using persistent storage can be displayed (or caused to be displayed) by the hardware processor. For instance, the operation can cause a computing device to display the graphical user interface for managing data. This operation for displaying the graphical user interface can be separate from operations 402 through 406 or, alternatively, form part of one or more of operations 402 through 406.

Figure 5:
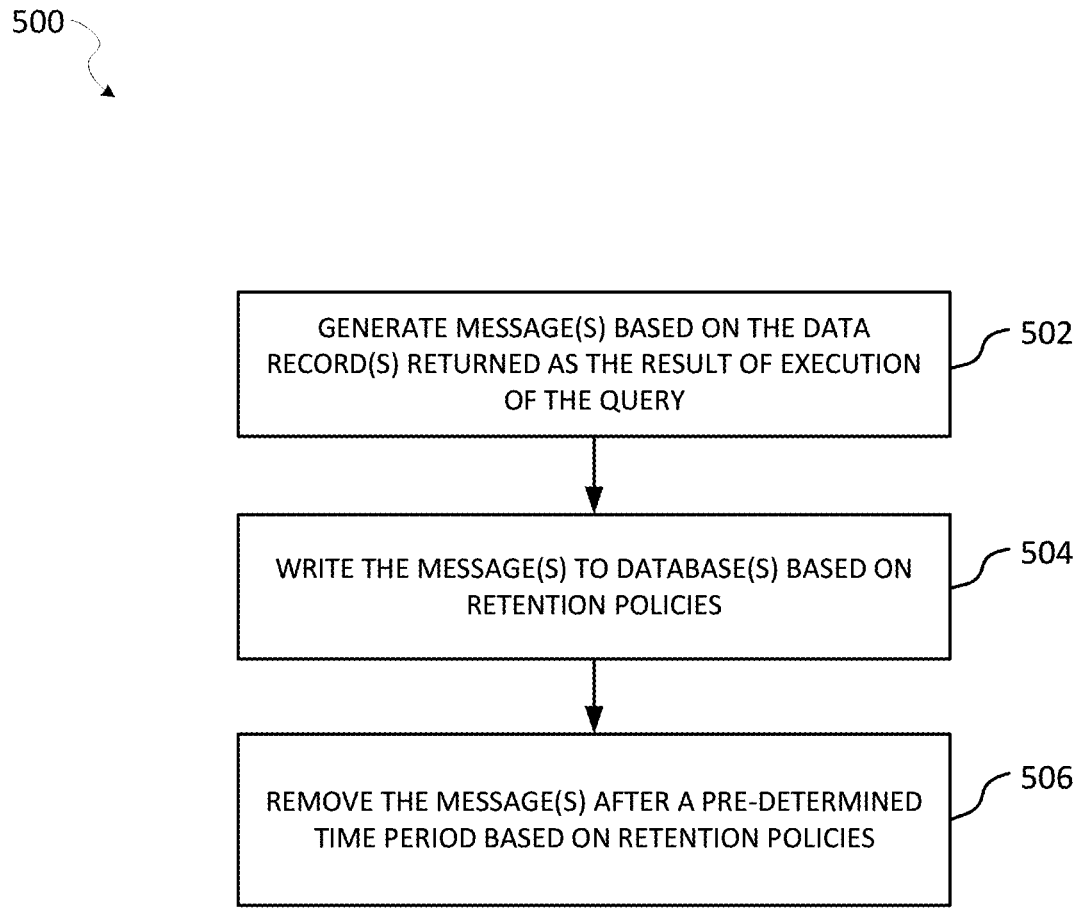
FIG. 5 is a flowchart illustrating an example method for managing data extraction, according to various embodiments of the present disclosure.

FIG. 5 is a flowchart illustrating an example method 500 for managing data extraction, according to various embodiments of the present disclosure. It will be understood that example methods described herein may be performed by a machine in accordance with some embodiments. For example, the method 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 500 may be a sub-routine of one or more of the operations of method 300. In various embodiments, one or more operations in method 500 may be performed subsequent to the operations of method 300.

At operation 502, a processor generates one or more messages based on the data record turned as the result of the execution of the query. Specifically, the processor is configured to convert the data record to compressed JavaScript Object Notation (JSON) data based on a mapping (e.g., the mapping as illustrated in FIG. 6) before generating the one or more messages.

At operation 504, a processor writes one or more messages to one or more databases based on one or more retention policies. For example, a data retention policy may specify that data, including messages as described herein, for a particular customer shall be stored for 45 days or no more than 30 days. Such data clearance or deletion operations can be implemented by configuring such retention policies for individual messages or periodically purging (or removing) all data from the underlying data stores.

At operation 506, a processor removes the one or more messages from the one or more databases after a predetermined time period based on one or more retention policies. The predetermined time period may refer to the message retention period or may refer to a time period after the expiration date of the retention period. For example, provided that the message retention period is configured as 30 days, in the former scenario, a message may be removed upon the expiration of the 30-day retention period. In the latter scenario, since the predetermined time period (e.g., 15 days) refers to the time period after the expiration date of the retention period (e.g., 30 days), the message may be removed after 45 days from the day of the retention, in various embodiments.

Though not illustrated, the method 500 can include an operation where a graphical user interface for managing data using persistent storage can be displayed (or caused to be displayed) by the hardware processor. For instance, the operation can cause a computing device to display the graphical user interface for managing data. This operation for displaying the graphical user interface can be separate from operations 502 through 506 or, alternatively, form part of one or more of operations 502 through 506.

FIG. 6 is a block diagram illustrating an example mapping 600 between data types, managed by an example data management system during operation, according to various embodiments of the present disclosure. As shown, the example mapping 600 includes a list of SQL-type data that maps to the corresponding JSON-type data. In various embodiments, the one or more data records returned as a result of the execution of the one or more queries may be SQL-type data. Upon receiving the one or more data records or determining the portions of data records to be transmitted to one or more destinations, the data management system (e.g., system 122, system 200) converts SQL-type data to JSON-type data, based on which one or more messages are generated. FIG. 6 illustrates a non-limiting example of a mapping between SQL-type data and JSON-type data. It will be appreciated that many other data types may be included in a mapping to facilitate the functionality described herein.

Figure 7:
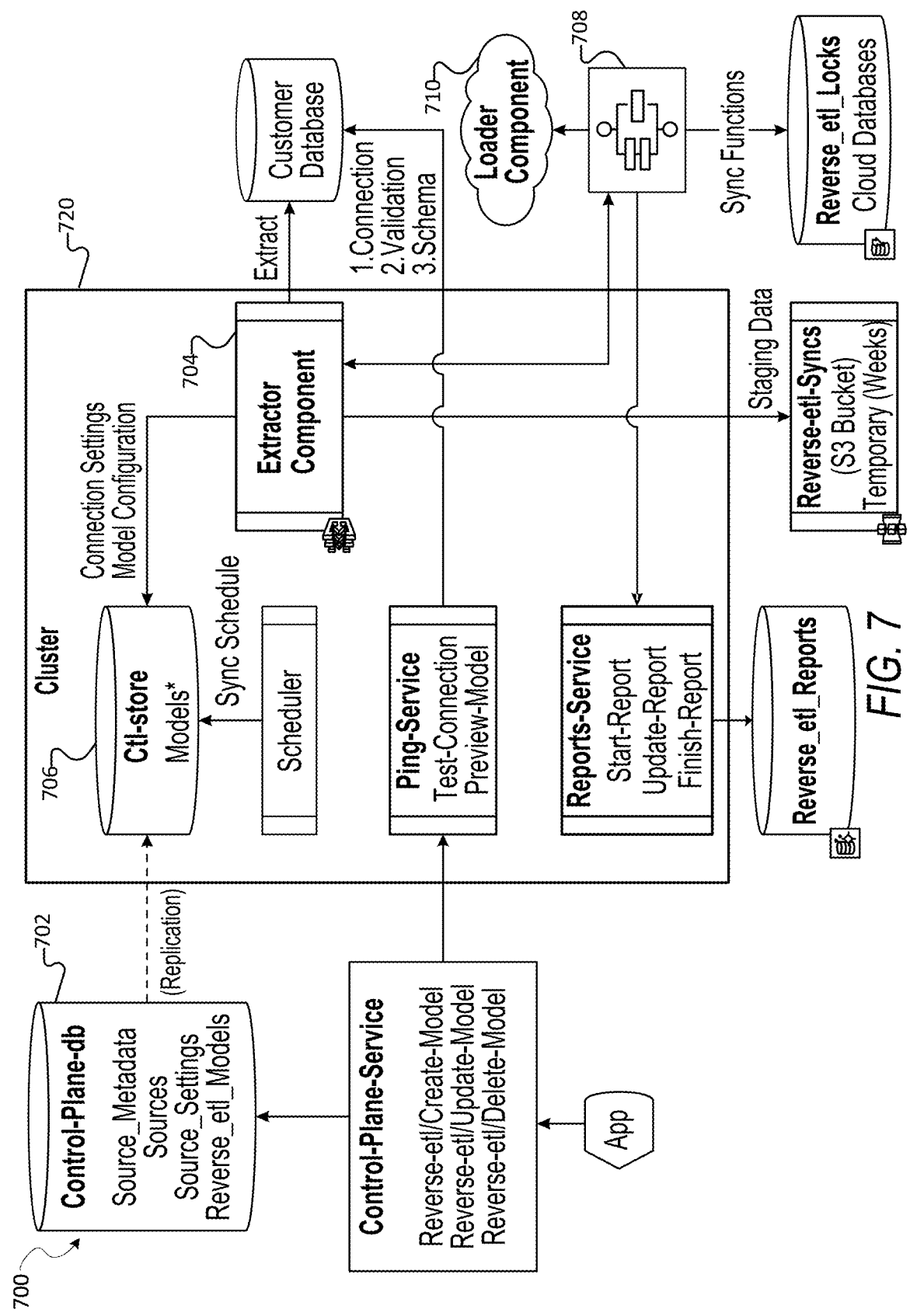
FIG. 7 is a block diagram illustrating an example networked computing architecture that includes an example data management system, according to various embodiments of the present disclosure.

FIG. 7 is a block diagram illustrating an example networked computing architecture 700 that includes an example data management system, according to various embodiments of the present disclosure. The example networked computing architecture 700 includes the data management system 122 described with respect to FIG. 1, the data management system 200 described with respect to FIG. 2, or individual components thereof. As illustrated, the example networked computing architecture 700 includes a cluster 720 that may be a cloud computing environment that hosts the data management system (e.g., system 122, system 200) to perform various functionality described herein. As shown, control plane databases 702 may store user input data via the control plane, metadata (e.g., checksum data, timestamp data), connection settings, model data, etc., as described herein. Certain data (e.g., model identifiers, source identifiers) stored in the control plane databases 702 may be replicated to Store 706 during operations described herein. Extractor component 704 and sync function 708 may be components of the data management system (e.g., system 122, system 200) that jointly performs operations described herein. The data management system may determine whether one or more messages, generated by either the extractor component 704 or the sync function 708, may be forwarded to a loader component 710 before being transmitted to one or more destinations.

Figure 8:
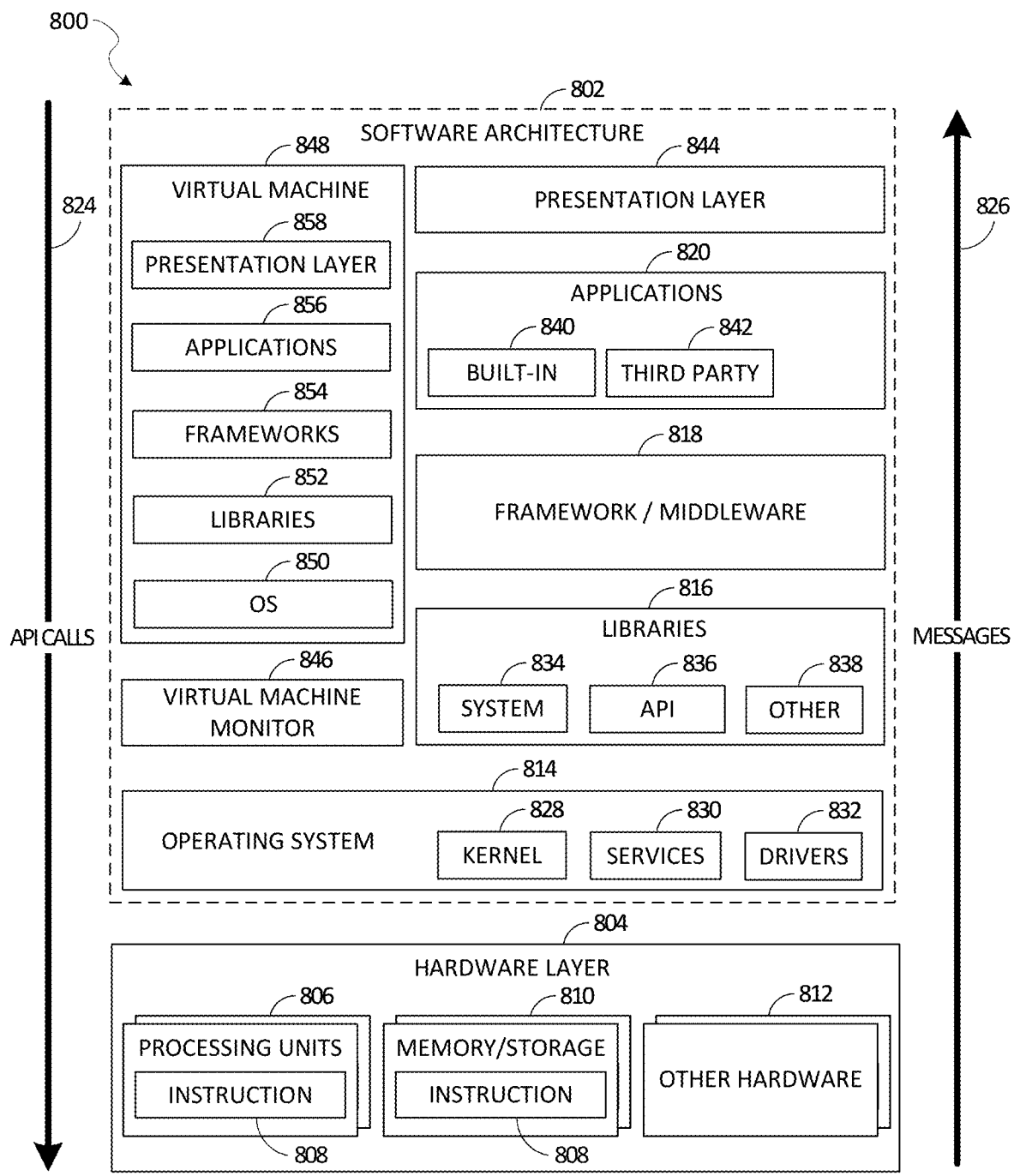
FIG. 8 is a block diagram illustrating a representative software architecture, which may be used in conjunction with various hardware architectures herein described, according to various embodiments of the present disclosure.

FIG. 8 is a block diagram illustrating an example of a software architecture 802 that may be installed on a machine, according to some example embodiments. FIG. 8 is merely a non-limiting example of software architecture, and it will be appreciated that many other architectures may be implemented to facilitate the functionality described herein. The software architecture 802 may be executing on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 800.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphical user interface functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a home application, a contacts application, a browser application, a book reader application, a location application, a media application, a messaging application, or a game application.

The third-party applications 842 may include any of the built-in applications 840, as well as a broad assortment of other applications. In a specific example, the third-party applications 842 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. The virtual machine 848 creates a software environment where applications/modules can execute as if they were executing on a hardware machine (e.g., the machine 900 of FIG. 9). The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

Figure 9:
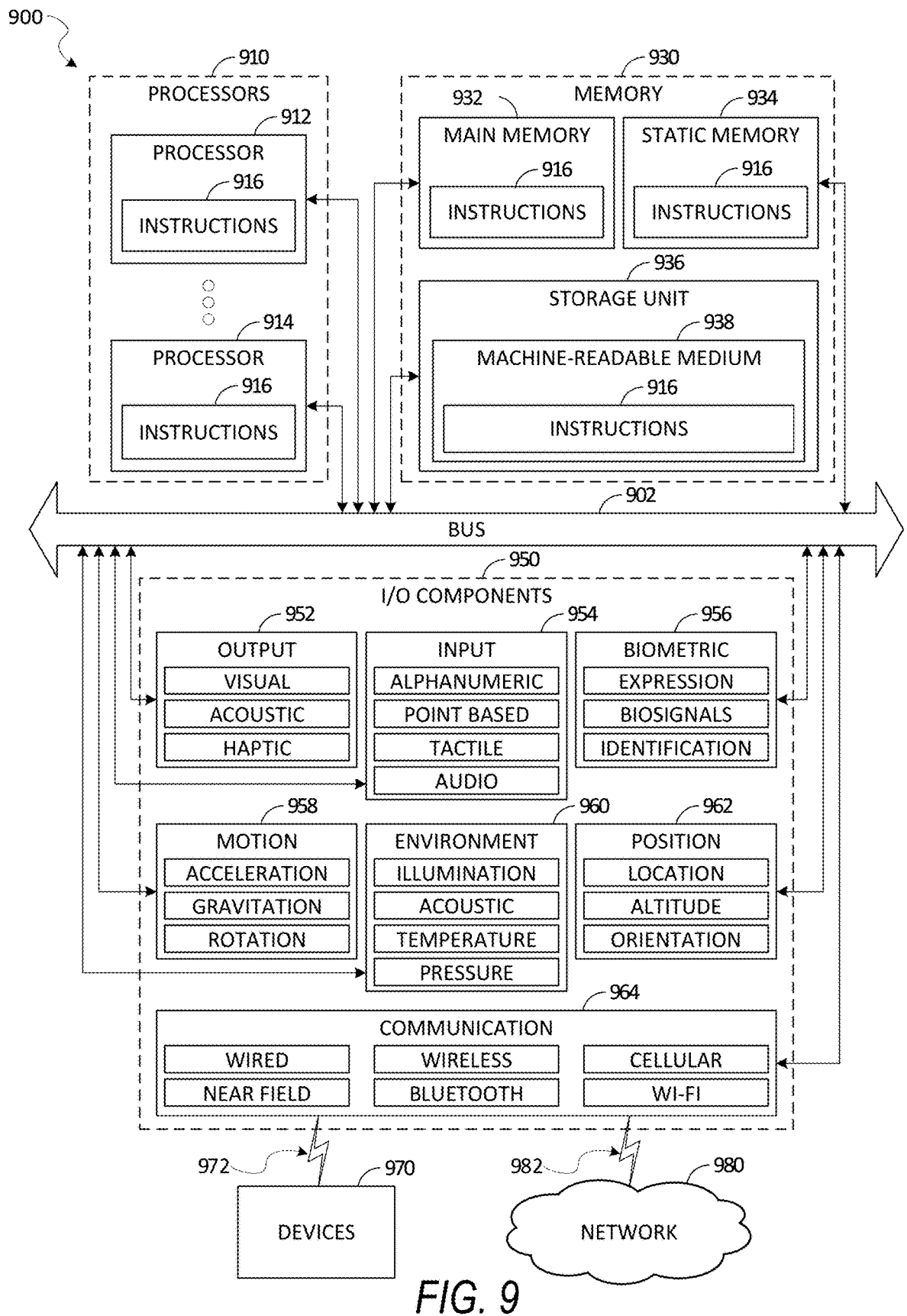
FIG. 9 is a block diagram illustrating components of a machine able to read instructions from a machine storage medium and perform any one or more of the methodologies discussed herein according to various embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 300 described above with respect to FIG. 3, the method 400 described above with respect to FIG. 4, and the method 500 described above with respect to FIG. 5. Instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an embodiment, the processors 910 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936 including machine-readable medium 938, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 950 may include biometric components 956, motion components 958, environmental components 960, or position components 962, among a wide array of other components. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 900, but deployed across a number of machines 900. In some example embodiments, the processors 910 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 930, 932, 934, and/or the memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
retrieving a control-plane configuration that includes a source identifier and a query;
establishing a connection with a source based on a source identifier, the source including a database;
executing the query against the database;
receiving a data record returned as a result of execution of the query, the data record being associated with metadata;
determining that the metadata has changed since a previously-returned data record that is returned in response to a previously-executed query;
causing the data record to be transmitted to a destination in response to receiving the query;
converting the data record returned as the result of execution of the query to compressed JavaScript Object Notation (JSON) data based on a mapping;
generating a message based on the compressed JSON data; and
writing the message to a database based on a retention policy.

2. The method of claim 1, further comprising:
determining that the metadata remains same since the previously-returned data record that is returned in response to the previously-executed query; and
causing data representing the previously-returned data record to be transmitted to the destination in response to receiving the query.

3. The method of claim 1, further comprising:
determining that the metadata has changed since a previously-returned data record that is returned in response to a previously-executed query; and
causing a difference between the previously-returned data record and a currently-returned data record to be transmitted to the destination in response to receiving the query.

4. The method of claim 1, further comprising:
determining one or more timestamps associated with the data record returned as a result of execution of the query;
identifying a portion of the data record associated with a timestamp specified in the query; and
causing the portion of the data record to be transmitted to the destination in response to receiving the query.

5. The method of claim 1, wherein the metadata comprises checksum data, and wherein the query is a Structured Query Language (SQL) query.

6. The method of claim 1, wherein the metadata comprises checksum data, wherein the checksum data is generated using a message-digest algorithm, and wherein the checksum data is stored in a data table in the database that stores the data record.

7. The method of claim 6, wherein the checksum data comprises a hash value generated based on one or more columns of the data record stored in the database.

8. The method of claim 1, further comprising:
determining a status of the data record based on the metadata associated with the data record, the status of the message including at least one of new, updated, or deleted; and
associating the status of the data record with the message.

9. The method of claim 1, further comprises:
removing the message after a predetermined time period based on the retention policy.

10. A system comprising:
at least one memory storing instructions; and
one or more hardware processors communicatively coupled to the at least one memory and configured by the instructions to perform operations comprising:
retrieving a control-plane configuration that includes a source identifier and a query;
establishing a connection with a source based on a source identifier, the source including a database;
executing the query against the database;
receiving a data record returned as a result of execution of the query, the data record being associated with metadata;
determining that the metadata has changed since a previously-returned data record that is returned in response to a previously-executed query;
causing the data record to be transmitted to a destination in response to receiving the query;
converting the data record returned as the result of execution of the query to compressed JavaScript Object Notation (JSON) data based on a mapping;
generating a message based on the compressed JSON data; and
writing the message to a database based on a retention policy.

11. The system of claim 10, wherein the operations further comprise:
determining that the metadata remains same since the previously-returned data record that is returned in response to the previously-executed query; and
causing data representing the previously-returned data record to be transmitted to the destination in response to receiving the query.

12. The system of claim 10, wherein the operations further comprise:
determining that the metadata has changed since a previously-returned data record that is returned in response to a previously-executed query; and
causing a difference between the previously-returned data record and a currently-returned data record to be transmitted to the destination in response to receiving the query.

13. The system of claim 10, wherein the operations further comprise:
determining one or more timestamps associated with the data record returned as a result of execution of the query;
identifying a portion of the data record associated with a timestamp specified in the query; and
causing the portion of the data record to be transmitted to the destination in response to receiving the query.

14. The system of claim 10, wherein the metadata comprises checksum data, and wherein the query is a Structured Query Language (SQL) query.

15. The system of claim 10, wherein the metadata comprises checksum data, wherein the checksum data is generated using a message-digest algorithm, and wherein the checksum data is stored in a data table in the database that stores the data record.

16. The system of claim 10, wherein the operations further comprise:
determining a status of the data record based on the metadata associated with the data record, the status of the message including at least one of new, updated, or deleted; and
associating the status of the data record with the message.

17. The system of claim 10, wherein the operations further comprise:
removing the message after a predetermined time period based on the retention policy.

18. A non-transitory computer-readable medium comprising instructions that, when executed by a hardware processor of a device, cause the device to perform operations comprising:
retrieving a control-plane configuration that includes a source identifier and a query;
establishing a connection with a source based on a source identifier, the source including a database;
executing the query against the database;
receiving a data record returned as a result of execution of the query, the data record being associated with metadata;
determining that the metadata has changed since a previously-returned data record that is returned in response to a previously-executed query;
causing the data record to be transmitted to a destination in response to receiving the query,
converting the data record returned as the result of execution of the query to compressed JavaScript Object Notation (JSON) data based on a mapping;
generating a message based on the compressed JSON data; and
writing the message to a database based on a retention policy.

* * * * *